United States Patent
Qin

(10) Patent No.: US 12,205,736 B2
(45) Date of Patent: Jan. 21, 2025

(54) CABLE PROTECTION DEVICE

(71) Applicant: AMBIT MICROSYSTEMS (SHANGHAI) LTD., Shanghai (CN)

(72) Inventor: Dong Qin, Shenzhen (CN)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 371 days.

(21) Appl. No.: 17/837,237

(22) Filed: Jun. 10, 2022

(65) Prior Publication Data
US 2023/0005641 A1 Jan. 5, 2023

(30) Foreign Application Priority Data

Jun. 30, 2021 (CN) .......................... 202110734118.7

(51) Int. Cl.
*H02G 15/08* (2006.01)
*H01B 7/18* (2006.01)

(52) U.S. Cl.
CPC .................................. *H01B 7/1805* (2013.01)

(58) Field of Classification Search
CPC ... H01B 7/02; H01B 7/04; H01B 7/06; H01B 13/012; H02G 15/08; H02G 15/113; H01R 4/70
USPC .......... 174/71 R, 72 R, 84 R, 87, 91, 92, 93; 439/135, 367, 369, 469, 521, 528, 687, 439/718, 731, 892
See application file for complete search history.

(56) References Cited

U.S. PATENT DOCUMENTS

| | | | | |
|---|---|---|---|---|
| 3,147,338 A | * | 9/1964 | Ekvall ....................... | H01R 4/38 |
| | | | | 174/92 |
| 3,715,459 A | * | 2/1973 | Hoffman .............. | H02G 15/113 |
| | | | | 174/76 |
| 5,017,739 A | * | 5/1991 | Hoffman .............. | H02G 15/113 |
| | | | | 174/92 |
| 5,322,973 A | * | 6/1994 | Dagan .................. | G02B 6/4446 |
| | | | | 174/41 |
| 5,594,210 A | * | 1/1997 | Yabe ........................ | H01R 4/70 |
| | | | | 174/76 |
| 5,610,370 A | * | 3/1997 | Fremgen .............. | H02G 15/085 |
| | | | | 174/91 |
| 2007/0154152 A1 | | 7/2007 | Morris | |

FOREIGN PATENT DOCUMENTS

| | | |
|---|---|---|
| CN | 101461109 | 6/2009 |
| CN | 101527432 | 9/2009 |
| CN | 206164037 | 5/2017 |
| CN | 106805347 | 6/2017 |

(Continued)

*Primary Examiner* — William H. Mayo, III
(74) *Attorney, Agent, or Firm* — ScienBiziP, P.C.

(57) ABSTRACT

A cable protection device is applied to outdoor device, and the outdoor device has a first part, a second part and a cable; the first part and the second part are connected by a first rotating shaft, and the cable is connected between the first part and the second part; the cable protection device has a cable protection structure a first surface of the cable protection structure is fixed to the first part, a second surface of the cable protection structure is fixed to the second part, and the cable is sealed and surrounded by the cable protection structure; when the first part and the second part are unfolded or folded by the first rotating shaft, the cable protection structure expands or closes.

7 Claims, 5 Drawing Sheets

(56) References Cited

FOREIGN PATENT DOCUMENTS

| | | | | |
|---|---|---|---|---|
| CN | 209434852 | | 9/2019 | |
| JP | 2012-151027 A | * | 1/2011 | ........... H01B 13/012 |
| TW | 201001857 | | 1/2010 | |

* cited by examiner

CABLE PROTECTION DEVICE

CROSS-REFERENCE TO RELATED APPLICATIONS

This application claims priority to Chinese Patent Application No. 202110734118.7 filed on Jun. 30, 2021, the contents of which are incorporated by reference herein.

FIELD

The subject matter herein generally relates to the field of cables, and particularly to a cable protection device.

BACKGROUND

Usually, when an outdoor device is in use, a cable may be exposed without protection. Therefore, in the outdoor environment, the cable can be easily bitten by animals, resulting in equipment failure.

BRIEF DESCRIPTION OF THE DRAWINGS

Implementations of the present technology will now be described, by way of example only, with reference to the attached figures.

DETAILED DESCRIPTION

Figure 1:
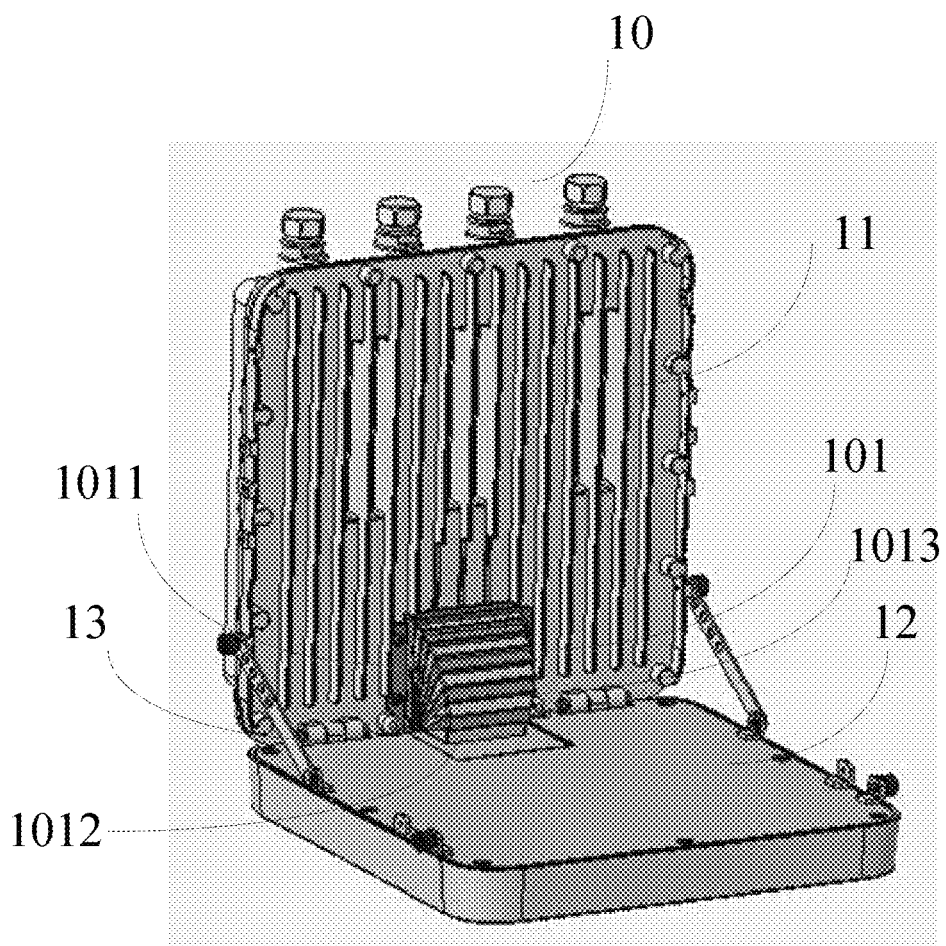
FIG. 1 is a structural diagram of an embodiment of a cable protection device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean at least one.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 is a structural schematic diagram of an embodiment of a cable protection device of the present disclosure. In the embodiment, the cable protection device 10 is applied to an outdoor device 1. The outdoor device 1 comprises a first part 11 and a second part 12. The first part 11 is connected to the second part 12 through a first rotating shaft 13, so that the first part 11 and the second part 12 can be unfolded or folded through the first rotating shaft 13. The outdoor device 1 also includes a cable (not shown in the FIG. 1), which is connected to the first part 11 and the second part 12. In a specific embodiment of the present disclosure, a rotation angle range of the first part 11 and the second part 12 rotated by the first rotating shaft 13 is 0-90 degrees.

In the embodiment, cable protection device 10 comprises a cable protection structure 101, set as a laminated structure. A first surface of the cable protection structure 101 is fixed to the first part, a second surface of the cable protection structure 10 is fixed to the second part, and the cable is sealed and surrounded by the cable protection structure 10. When the first part 11 and the second part 12 are unfolded or folded by the first rotating shaft 13, the cable protection structure 101 expands or closes.

In the embodiment, the cable protection structure 101 comprises a first fixing part 1011, a second fixing part 1012 and multiple rotating movable parts 1013. Both the first fixing part 1011 and the second fixing part 1012 are in a shape of Π. The first fixing part 1011 is fixed to the first part 11 by screws, and the second fixing part 1012 is fixed to the second part 12 by screws. The multiple rotating movable parts 13 are connected between the first fixing part 1011 and the second fixing part 1012. Each rotating movable part is in a shape of Π. A first end of the each rotating movable part 1013, a first end of the first fixing part 1011 and a first end of the second fixing part 1012 are sequentially connected by a second rotating shaft, and a second end of the each rotating movable part, a second end of the first fixing part 1011, and a second end of the second fixing part 1012 are sequentially connected by a third rotating shaft. When the first part 11 and the second part 12 are unfolded by the first rotating shaft 13, the multiple rotating movable parts 13 are unfolded to form a closed accommodating space for accommodating the cable. In the embodiment, the rotating shaft of the cable protection device 10 is coaxial with the rotating shaft of the outdoor device 1, so that the multiple rotating movable parts 1013 of the cable protection device 10 can be unfolded or folded with the first part 11 and the second part 12. The number of the rotating movable parts 1013 is related to the height of the cable protection device 10 after closing, and the number of the rotating movable parts 1013 can be reduced when the height is large.

Figure 2:
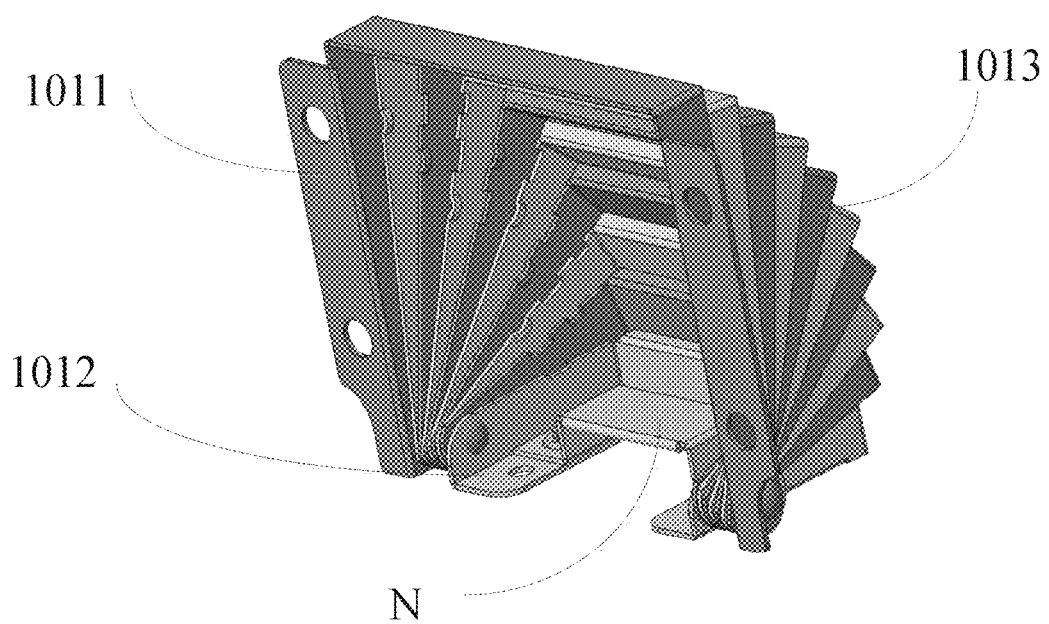
FIG. 2 is a structural diagram of another embodiment of the cable protection device of the present disclosure.
Figure 3:
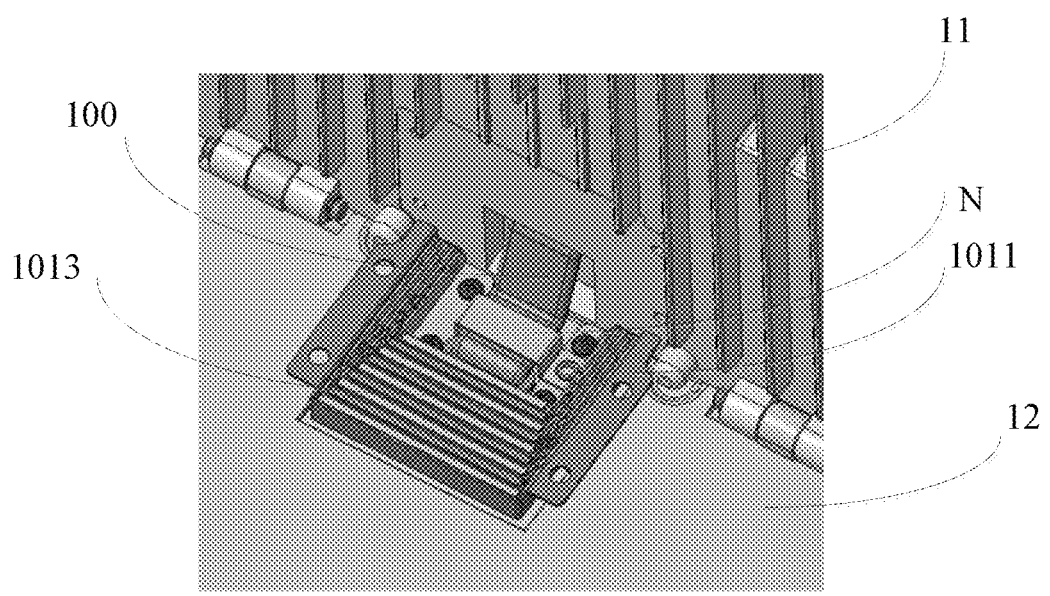
FIG. 3 is the schematic diagram of an n-type structure for fixing a cable.

As shown in FIG. 2, FIG. 2 is a structural diagram of another embodiment of the cable protection device of the present disclosure. In the embodiment, the second fixing part 1012 further comprises an n-type structure N. The n-type structure N is fixed on the second fixing part and configured to fix the cable 100 to keep the cable 100 in a bent state. Also referring to FIG. 3, which is a schematic diagram of the n-type structure used for fixing the cable. As shown in FIG. 3, when the second fixing part 1012 is fixed to the second part 12, the n-type structure N fixes the cable 100, so that the cable 100 is kept in the bent state. In order to show the working state of the n-type structure N more clearly, FIG. 3 is a schematic diagram of the first fixing part 1011 not being fixed to the first part 11.

Figure 4:
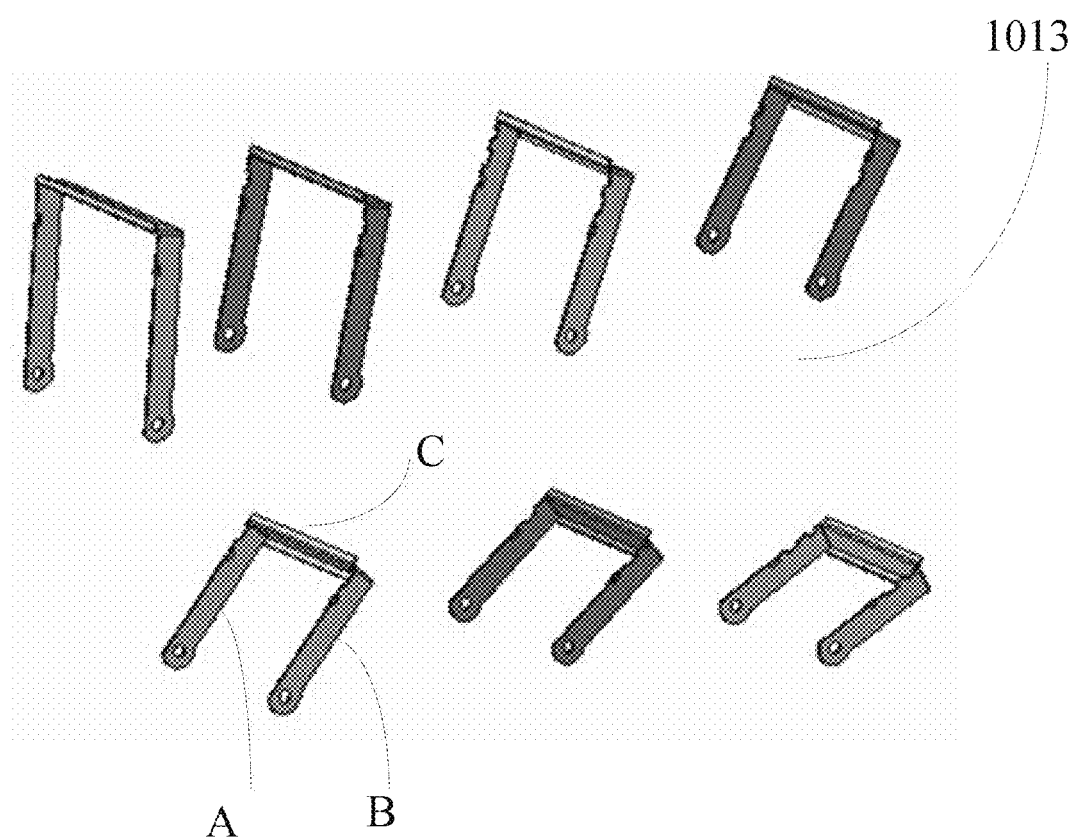
FIG. 4 is a structural diagram of a plurality of rotating moving parts of the present disclosure.
Figure 5:
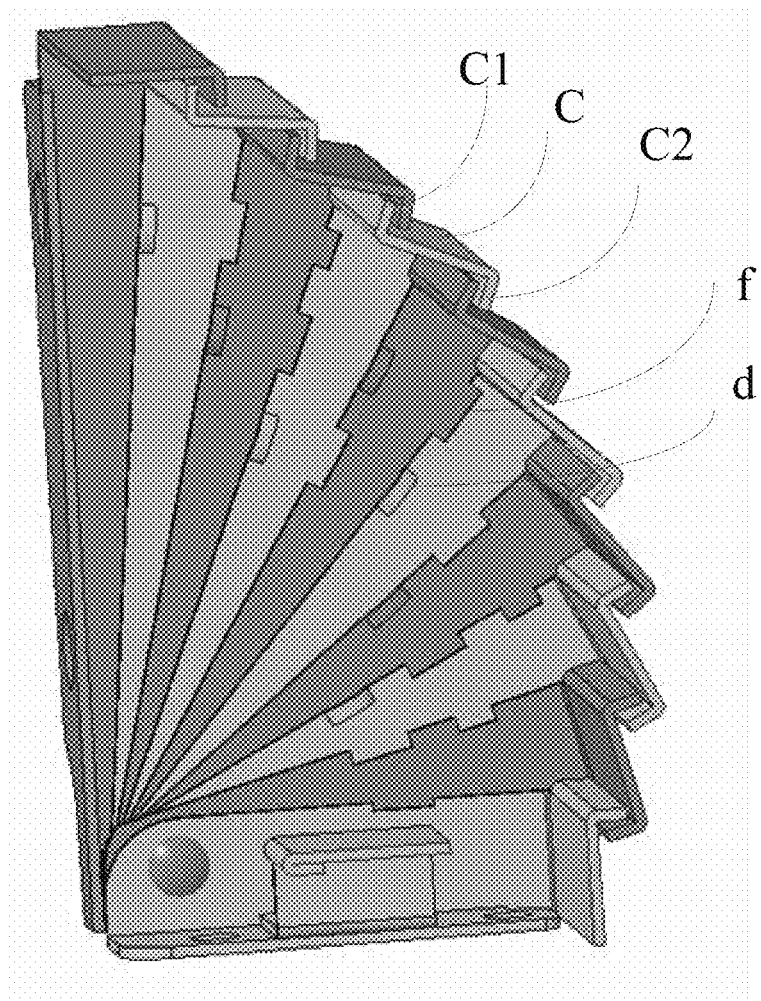
FIG. 5 is a side view of a cable protection structure of the present disclosure.

Referring to FIG. 4-5 together, FIG. 4 is a structural diagram of multiple rotating moving parts of the present disclosure, and FIG. 5 is a side view of the cable protection structure of the present disclosure. As shown in the figure, each rotating movable part 1013 is composed of a first pillar A, a second pillar B and a plate surface C. The first pillar A is connected to a first side of the plate surface C, and the second pillar B is connected to a second side of the plate surface C. In the embodiment, the plate surface C is in a shape of S, comprising: a section C1, a first card C2 and a second card C3. A first side of the section C1 is connected to the first pillar A, and a second side of the section C1 is connected to the second pillar B. The first card C2 is connected to a third side of the section C1 and the second card C3 is connected to a fourth side of the section C1. An extension direction of the first card C2 is opposite to an extension direction of the second card C3. Both the first pillar A and the second pillar B comprise a bridge structure d, and the bridge structure d is configured to push the multiple rotating movable parts 1013 to rotate together, and further configured to prevent a dislocation of adjacent rotating moving parts 1013. The first pillar A and the second pillar B also comprise a notch structure f for giving way to the bridge structure d when the multiple rotating moving parts 1013 are folded.

Compared with the prior art, the cable protection device provided by the embodiment of the present disclosure is applied to an outdoor device, the outdoor device comprises a first part, a second part and a cable, the first part and the second part are connected by a rotating shaft, the cable is connected between the first part and the second part, and the cable protection device comprises a cable protection structure. When the first part and the second part are unfolded or folded through the rotating shaft, the cable protection structure is expanded or closed, so that the cable is accommodated in the cable protection structure, so as to avoid being exposed and bitten by animals, resulting in equipment failure.

Many details are often found in the art such as the other features of a mobile terminal. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A cable protection device, applicable in an outdoor device, wherein the outdoor device comprises a first part, a second part and a cable, and the first part and the second part are connected by a first rotating shaft, the cable is connected between the first part and the second part, and the cable protection device comprises:

a cable protection structure, wherein, a first surface of the cable protection structure is configured to be fixed to the first part of the outdoor device, a second surface of the cable protection structure is configured to be fixed to the second part of the outdoor device, and the cable protection structure is adapted to seal the cable of the outdoor deice by lamination; and wherein when the first part and the second part are unfolded or folded by a first rotating shaft of the outdoor device, the cable protection structure expands or contract, respectively;

wherein the cable protection structure comprises:

a first fixing part, having a shape of Π and configured to be installed to the first part;

a second fixing part, having the shape of Π and configured to be installed to the second part; and multiple rotating movable parts, each connected between the first fixing part and the second fixing part, wherein each of the rotating movable parts has the shape of Π, and a first end of each rotating movable part, a first end of the first fixing part and a first end of the second fixing part are sequentially connected by a second rotating shaft, and a second end of each rotating movable part, a second end of the first fixing part, and a second end of the second fixing part are sequentially connected by a third rotating shaft, wherein when the first part and the second part are unfolded by the first rotating shaft, the multiple rotating movable parts are unfolded to form a enclosed accommodating space configured for accommodating the cable.

2. The cable protection device of claim 1, wherein the second fixing part further comprises:

a n-type structure, fixable on the second fixing part and configured to restrain the cable in a bent shape.

3. The cable protection device of claim 2, wherein each of the multiple rotating movable parts comprises a first pillar, a second pillar, and a board surface, and the first pillar is connected to a first side of the board surface, the second pillar is connected to a second side of the board surface.

4. The cable protection device of claim 3, wherein the board surface has a shape of S and comprises:

a cut plane, comprising a first side, a second side, a third side and a fourth side, the first side is connected to the first pillar, and the second side is connected to the second pillar;

a first card connected to the third side of the cut surface;

a second card connected to the fourth side of the cut surface, and an extension direction of the first card being opposite to an extension direction of the second card board.

5. The cable protection device of claim 4, wherein each of the first pillar and the second pillar comprises a bridge structure configured for pushing the multiple rotating movable parts together, and preventing dislocations of adjacent ones of the rotating movable parts.

6. The cable protection device of claim 5, wherein each of the first pillar and the second pillar further comprises a notch structure configured for yield to the bridge structure when the multiple rotating moving parts are folded.

7. The cable protection device according to claim 1, a range of a rotation angle of the first part and the second part rotated by the rotating shaft is 0 to 90 degrees.

* * * * *